United States Patent [19]

Husby et al.

[11] Patent Number: 5,011,182
[45] Date of Patent: Apr. 30, 1991

[54] VELOCITY CHANGE SENSOR WITH CONTACT RETAINER

[75] Inventors: Harald S. Husby, Budd Lake; Allen K. Breed, Boonton Township, Morris County; Ted Thuen, Morris Plains, all of N.J.

[73] Assignee: Breed Automotive Technology, Inc., Boonton Township, Morris County, N.J.

[21] Appl. No.: 417,914

[22] Filed: Oct. 6, 1989

[51] Int. Cl.[5] ..................... B60R 21/32; H01H 35/02; H01H 35/14
[52] U.S. Cl. .................................. 280/735; 180/282; 200/61.45 M; 200/61.53
[58] Field of Search .............. 200/61.45 R, 61.45 M, 200/61.53; 180/282; 280/734, 735

[56] References Cited

U.S. PATENT DOCUMENTS

| | | | |
|---|---|---|---|
| 2,997,557 | 8/1961 | Gillmor et al. | 200/61.45 M |
| 3,132,220 | 5/1964 | Uri et al. | 200/61.45 M |
| 3,794,794 | 2/1974 | Provancher | 200/61.53 |
| 4,020,302 | 4/1977 | Hasegawa . | |
| 4,039,790 | 8/1977 | Treckman . | |
| 4,329,549 | 5/1982 | Breed | 200/61.45 M |
| 4,638,130 | 1/1987 | Grossler . | |

FOREIGN PATENT DOCUMENTS

| | | |
|---|---|---|
| 2051482 | 1/1981 | United Kingdom . |
| 1586611 | 3/1981 | United Kingdom . |
| 1604288 | 12/1981 | United Kingdom . |
| 1435873 | 5/1976 | United Kingdom . |

OTHER PUBLICATIONS

United Kingdom Search Report dated Nov. 6, 1990.

*Primary Examiner*—Charles A. Marmor
*Assistant Examiner*—Karin Tyson
*Attorney, Agent, or Firm*—Kane, Dalsimer, Sullivan, Kurucz, Levy, Eisele and Richard

[57] ABSTRACT

An accelerometer for sensing velocity changes particularly suited for passenger restraint systems in a motor vehicle for the deployment of an air bag includes a housing with contact blades and a contacting element. The contacting element is arranged to move toward the contact blades when a deceleration exceeding a threshold level is sensed. A retaining element is provided to set the blades in a preselected position so that the blades are contacted by the contacting element simultaneously thereby improving the response time of the accelerometer.

12 Claims, 2 Drawing Sheets

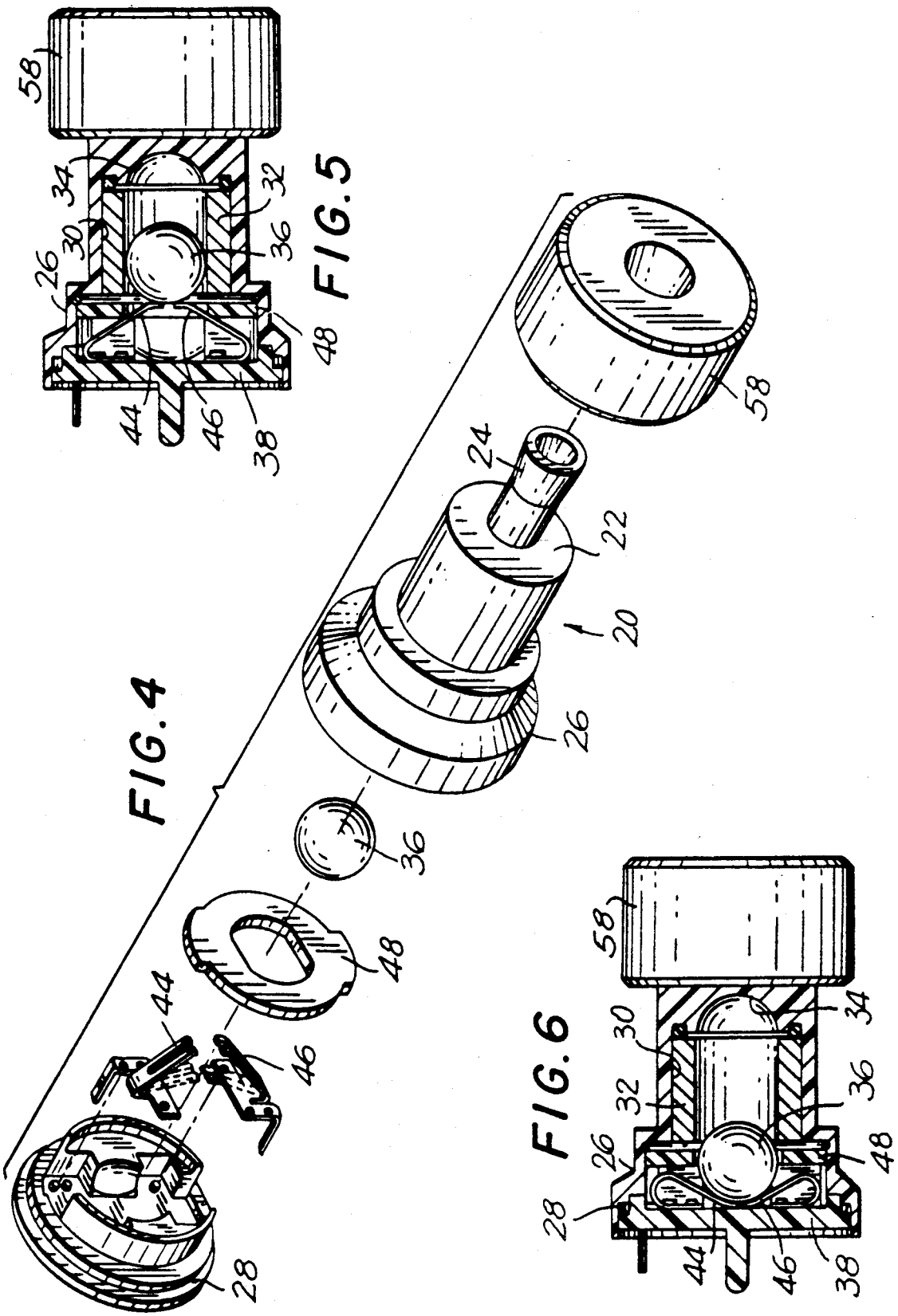

VELOCITY CHANGE SENSOR WITH CONTACT RETAINER

BACKGROUND OF THE INVENTION

1. Field of the invention

This invention pertains to a velocity change sensor or accelerometer used in motor vehicles for detecting sudden changes in velocity and for activating in response a passenger restraining device such as an air bag. More particularly, this device includes an element which moves to a preset position in response to a sudden deceleration to touch a pair of contact blades, said device also having a contact retainer for positioning the contact blades in a preselected manner.

2. Description of the Related Art

Studies have been made which indicate that injuries in motor vehicle accidents, especially at high speeds, can be substantially reduced or eliminated by the use of passenger restraint systems. (The term "passenger" is used to cover the driver of a car as well.) These systems include an inflatable balloon usually termed an air bag which normally is stored away in the instrument panel or the steering wheel. When the motor vehicle is subjected to a sudden deceleration, the air bag is inflated and is deployed automatically in a position which cushions the passengers, restrains their movement and prevents contact between them and the automobile interior such as the windshield, the steering wheel. The instrument panel and so on. Of course, a crucial element of all such systems is the velocity change sensor or accelerometer which initiates the inflation and deployment of the air baqs. The motion of the motor vehicle must be carefully and precisely monitored so that the air bags can be deployed very fast, before the passengers suffer any substantial injury.

A velocity change sensor is disclosed in U.S. Pat. No. 4,329,549 assigned to the same company as the present invention. This sensor comprises a tubular housing surrounding a metallic shell, a metal ball and a magnet biasing the ball toward a first end of the shell. At the second end of the shell there are a pair of electrical contact blades. The sensor is positioned in the motor vehicle in an orientation such that when the motor vehicle experiences a deceleration which exceeds a preset level, the ball moves from the first toward the second end, making contact with the two blades. Because the blades and the ball are made of on electrically conducting material, when the ball contacts the blades, an electrical path is established between the two blades. This electrical path is used to initiate a signal for the deployment of the air bags.

Accuracy of the sensor described in U.S. Pat. No. 4,329,549 depends to a large extent on the proper alignment of the two electrical contact blades to insure that they will contacted by the ball simultaneously. When the two blades are not aligned evenly, they are disposed at different distances with respect to an end of the shell. Therefore during the deceleration of the motor vehicle, as the ball moves toward the second end of the shell, it touches one of the blades first. This touch slows the ball down so that precious time is wasted before ball touches the second contact blade to establish the electrical path. However, it is essential that the time between the motor vehicle starts decelerating and the deployment of the air bag be kept at an absolute minimum and constant value. If this delay is too long, the air bag cannot perform its function of protecting the passengers.

The contact blades are typically made of a relatively thin material such copper or a similar alloy which is flexible and easy to bend. Because of these characteristics, it has proven very difficult at times and somewhat time consuming on occasion to manufacture and assemble these blades so that they are aligned evenly so that the ball will contact each blade at the same time. To maintain a timely and predictable reaction time of the sensor, it is also essential that the distance from the ball rest position to the contact point be constant. The contact retainer also achieves this goal. Furthermore, even if they are aligned perfectly initially, these blades are frequently bent out of alignment during the assembly and installation of the sensor.

OBJECTIVES AND SUMMARY OF THE INVENTION.

In view of the above mentioned disadvantages of the prior art, it is an objective of the present invention to provide a restraint system in which the reaction time, i.e. the time between the vehicle deceleration, and the deployment of the air bags is at all times predictable.

A further objective is to provide a restraint system with a velocity sensor in which a moving element touches two electrical contact blades substantially simultaneously. A further objective is to provide a sensor which is easy and inexpensive to manufacture, and in which critical elements such as the electrical contacts remain in alignment during assembly.

Other objectives and advantages of the invention shall become apparent from the following description. An accelerometer constructed in accordance with the invention includes a housing with contact blades and a contacting element which provides an electric path between the blades when a deceleration above a threshold level is sensed. A retaining member is also provided in the housing to insure that the contacting element contacts the blades simultaneously. Thereafter an electric signal is sent to a control unit which deploys the air bag within the motor vehicle. Thereby the reaction time of the accelerator is advantageously reduced to insure that the air bag is deployed early enough to prevent injury to the passengers.

BRIEF DESCRIPTION OF THE FIGURES

FIG. 4 shows an exploded view of the accelerometer of FIG. 2;

FIG. 5 shows a side cross-sectional view of the accelerometer of FIG. 2 with the ball just touching the electrical contacts;

FIG. 6 shows a side cross-sectional view of the accelerometer of FIG. 2 with the ball in its left-most position.

DETAILED DESCRIPTION OF THE INVENTION

Figure 1:
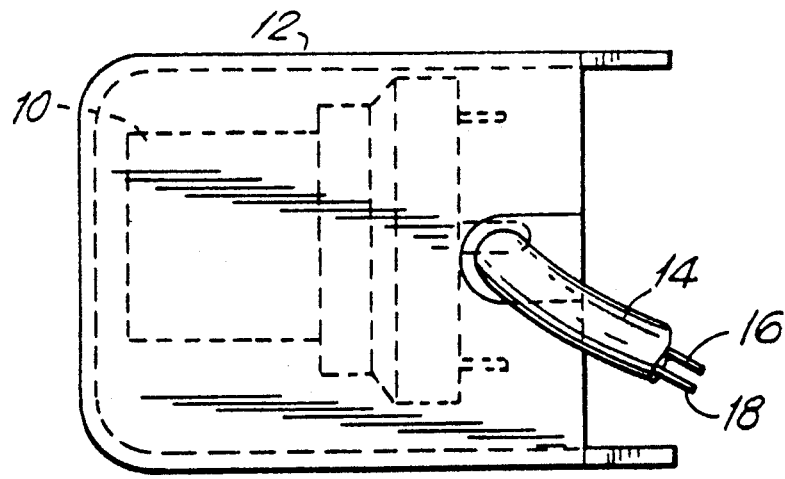
FIG. 1 shows a side elevational view of an accelerometer constructed in accordance with the invention disposed in a case.

Turning now to the Figures, an accelerometer or velocity change sensor 10 constructed in accordance with this invention is usually disposed in a case 12 mounted on the motor vehicle (not shown). The sensor is connected by a cable 14 with at least two conductors 16, 18 to a control device for the deployment of the air bag.

The sensor 10 has a tubular body 20 terminating at one end with an end wall 22 with an external hollow extension 24. Opposite wall 22, the body 20 has an enlarged crown 26 to form a seat for a rubber gasket 28. The body 20 is preferably made of a plastic material. The body 20 has an inner cylindrical wall 30. Secured to this wall 30 there is a metallic sleeve 32. End wall 22 is formed with a spherical depression 34 for holding metallic ball 36. The diameter of ball 36 is slightly smaller than the diameter of sleeve 32.

Figure 3:
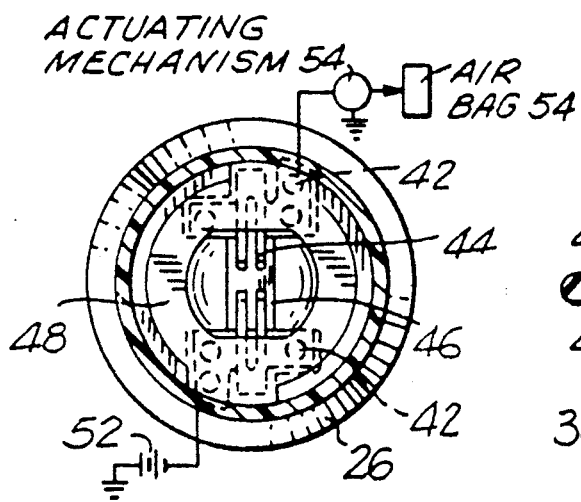
FIG. 3 shows a cross-sectional view of the accelerometer of FIG. 2 taken along line 3—3.

Crown 26 holds a plastic cap 38 having two metallic pins 40, 42, each supporting a corresponding contact blade 44, 46 respectively. Cap 38 also has a plastic retainer disk 48 secured to the cap sidewalls for example by an interference fit, an adhesive, ultrasonic welding, or other well known means. The disk has an inner hole 50 dimensioned to contact and retain the blades 44 and 46 in a predetermined position. As can be seen more clearly in the exploded view of FIG. 4, before the retainer disk is installed, blades 44, 46 are formed in a somewhat relaxed, open position. After the retainer disk 48 is installed, it contacts and biases the blades inwardly to a position indicated by the dashed lines toward the longitudinal axis of the sensor. The biasing force is provided by the flexibility of the blades. As seen in FIG. 4 while in the open position indicated by the solid lines, the blades 44, 46 are disposed at a relatively arbitrary distance from the main body or the cap, and therefore are rather difficult to position evenly, the retainer disk positions the blades accurately to a preset distance from the cap. Furthermore the retainer disk maintains the blades in their preselected positions and protects them from distortion during the assembly of the sensor. As shown in FIG. 3, contact blades 44 and 46 are connected serially in an electrical circuit comprising a battery 52, and an actuating mechanism 54. Actuating device 54 controls and deploys one or more air bags 56.

Figure 2:
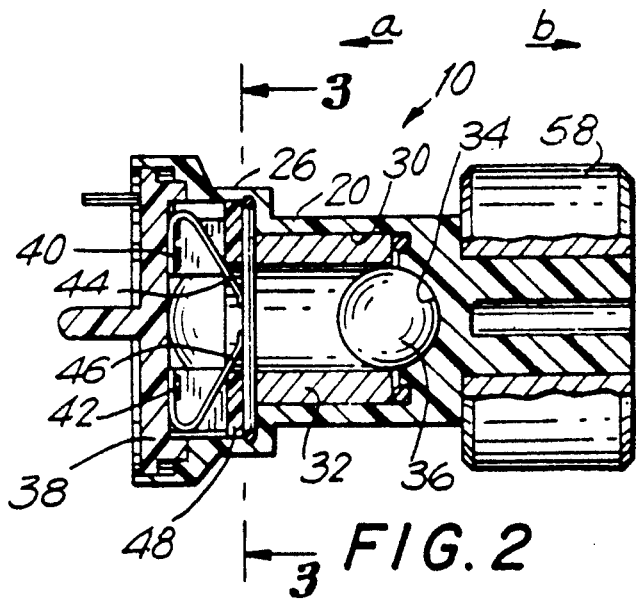
FIG. 2 shows a side cross-sectional view of the accelerometer of FIG. 1.

A toroidal permanent magnet 58 is disposed on extension 24 as shown. The magnet generates a magnetic field which biases the ball 36 toward the end wall 22 in the position shown in FIG. 2. Housing 12 is oriented within the motor vehicle so that cap 38 is toward the front of the motor vehicle, while end wall 22 is disposed toward the rear of the vehicle. In FIG. 2 the normal direction of movement of the vehicle is indicated by arrow a. When the vehicle hits an object it is decelerated in direction b. If the force of deceleration is larger than the preset biasing force of the magnet 58, the ball 36 overcomes the force applied by the magnet 56, and moves in direction a toward cap 38. Because of retainer disk 48 maintains the contact blade even, the ball as it moves, contacts blades 44, 46 simultaneously (FIG. 5). The ball then continues its movement in direction until it is brought to a halt by the blades and the retainer disk 48 (FIG. 6). After the deceleration is complete, the ball 36 returns towards its rest position as shown in FIG. 7.

Meanwhile the contact between the ball 36 and blades 44, 46 allows current to flow from battery 52 to actuating device 54 which in response deploys air bag(s) 56. As previously mentioned, without the retainer feature 48, the blades could be disposed unevenly, so that as the ball 36 moves in direction a it contacts only one of the blades. The movement of the ball is slowed down by the first blade so that the ball does not contact the second blade until several milliseconds later thereby delaying the actuation of the air bag.

Figure 7:
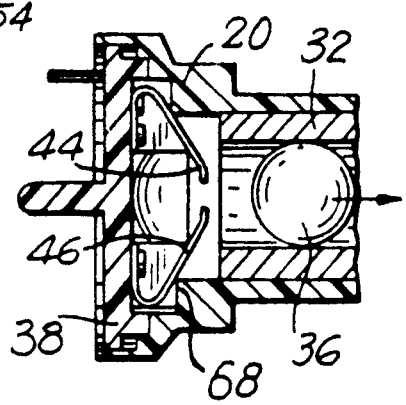
FIG. 7 shows a cross-sectional view of the accelerometer of FIG. 2 with the ball moving back to the rest position.

As shown in FIG. 7, the retainer disk 48 may be eliminated, if tubular body 20 is provided with an inner shoulder 68. The shoulder is constructed and positioned to bias the blades 44, 46 as shown.

Obviously numerous modifications may be made to the invention without departing from its scope as defined in the appended claims.

I claim:

1. An accelerometer for sensing velocity changes comprising:
   a housing with a first end a second end opposite said first end and defining a chamber therebetween;
   a pair of flexible contact means disposed at said first end and having contact ends extending into said chamber;
   retaining means disposed in said housing for biasing said contact ends to a preselected position with respect to said first end;
   a sensing element movably disposed in said housing; and
   biasing means for generating a biasing force on said sensing element for urging said sensing element toward a first position, said sensing element being constructed and arranged to move toward a second position away from said first position in response to a deceleration force exceeding said biasing force, for contacting said contact ends in said preselected position.

2. The accelerometer of claim 1 wherein said contact means and said sensing element comprise an electrically conducting material for establishing an electric path when said sensing means contacts said contact means.

3. The accelerometer of claim 1 wherein said retainer means holds said contact means in said preselected position for contacting said pair of contact means simultaneously with said sensing means.

4. The acceleration of claim 1 wherein said biasing means comprises a permanent magnet.

5. A passenger restraint system for a motor vehicle comprising:
   an air bag disposed in the motor vehicle;
   a control unit for selectively deploying said air bag in said motor vehicle for protecting a passenger in a crash; and
   an accelerometer for sensing a velocity change of said motor vehicle couple to said control unit and comprising:
      a housing disposed in said motor vehicle and defining a chamber;
      a pair of flexible contact blades disposed in said housing and having blade ends extending into said chamber;
      contact closing means arranged said housing for closing an electrical contact between said contact blades when said motor vehicle decelerates at a level exceeding a threshold level; and
      contact retainer means arranged in said housing for biasing said contact blade ends in a preselected position wherein said contact closing means closes said contact blades substantially simultaneously.

6. The passenger restraint system of claim 5 wherein said contact closing means comprises a contacting element movably disposed in said housing and biasing means for biasing said contacting element.

7. The passenger restraint system of claim 6 wherein said biasing means urges said contacting element toward a first position away from said contact blades.

8. The passenger restraint system of claim 7 wherein said housing is arranged in a housing position in which said contacting element is urged toward said contact blades when said motor vehicle is decelerated.

9. The passenger restraint system of claim 7 wherein said biasing means comprises a permanent magnet for applying a magnetic force on said contacting element.

10. The passenger restraint system of claim 9 wherein said biasing means further comprises a conductive sleeve disposed inside said housing for applying said magnetic force to said contacting element.

11. The passenger restraint system of claim 9 wherein said contacting element comprises a ball made of an electrically conductive material.

12. The accelerometer of claim 1 wherein each of said contact means includes a blade secured to said first end and extending into said chamber, and wherein said retaining means includes a member extending from said housing into said chamber to bend said blades toward one of said ends.

* * * * *